(12) United States Patent
Sullivan et al.

(10) Patent No.: US 9,620,845 B1
(45) Date of Patent: Apr. 11, 2017

(54) BRACKET FOR ANTENNA ATTACHMENT

(71) Applicants: Wireless Construction, Inc., Standish, ME (US); Clement J. Salek, Franklin, MA (US)

(72) Inventors: Michael Sullivan, Standish, ME (US); Kyle Purington, Greene, ME (US); Clement J. Salek, Franklin, MA (US); Todd Boothby, Steep Falls, ME (US)

(73) Assignee: Wireless Construction, Inc., Standish, ME (US)

( * ) Notice: Subject to any disclaimer, the term of this patent is extended or adjusted under 35 U.S.C. 154(b) by 0 days.

(21) Appl. No.: 15/068,901

(22) Filed: Mar. 14, 2016

(51) Int. Cl.
| | |
|---|---|
| *H01Q 1/12* | (2006.01) |
| *F16M 13/02* | (2006.01) |
| *H01Q 1/22* | (2006.01) |
| *B60D 1/06* | (2006.01) |

(52) U.S. Cl.
CPC .......... *H01Q 1/1228* (2013.01); *F16M 13/02* (2013.01); *H01Q 1/125* (2013.01); *B60D 1/06* (2013.01); *H01Q 1/12* (2013.01); *H01Q 1/22* (2013.01)

(58) Field of Classification Search
CPC .......... B60D 1/06; B60D 1/065; B60D 1/345; H01Q 1/22; H01Q 1/12; H01Q 1/1228; H01Q 1/125; H01Q 3/08
USPC ........... 248/218.4, 288.11, 288.31, 514, 523; 343/765, 880, 882, 878
See application file for complete search history.

(56) References Cited

U.S. PATENT DOCUMENTS

| | | | |
|---|---|---|---|
| 2,955,288 A | 10/1960 | Palmer | |
| 3,401,390 A | 9/1968 | Braccini et al. | |
| 3,450,378 A | 6/1969 | Cucka | |
| 3,482,856 A * | 12/1969 | Reese | B60D 1/345 280/406.2 |
| 3,782,762 A * | 1/1974 | Nagy | B60D 1/065 280/507 |
| 4,037,229 A | 7/1977 | Dunk | |
| 4,931,809 A | 6/1990 | Putman et al. | |
| 6,404,400 B1 * | 6/2002 | Tulloch | H01Q 19/132 343/765 |
| 6,480,172 B1 * | 11/2002 | Sawyer | H01Q 1/12 343/874 |
| 7,046,210 B1 * | 5/2006 | Brooker | H01Q 3/08 343/880 |
| 7,557,764 B2 * | 7/2009 | Krajicek | H01Q 1/3275 343/713 |
| 7,737,900 B1 | 6/2010 | Saindon | |
| 8,564,498 B2 | 10/2013 | Singer | |

(Continued)

*Primary Examiner* — Tan Le
(74) *Attorney, Agent, or Firm* — Chris A. Caseiro; Caseiro Burke LLC

(57) ABSTRACT

An antenna bracket that enables relatively easy alignment of an antenna on a support structure such as a utility pole or tower. The bracket provides for low profile antenna attachment. The bracket includes a first bracket member that is joined to the support structure, a second bracket member that is coupled to the antenna, and a bracket interface member that is coupled to the first bracket member. An alignment device formed with a coupling body and a curved member extending from the coupling body is retained between the bracket interface member and the first bracket member and is secured to the second bracket member. The curved member enables fine movement of the antenna in any selectable direction to ensure its alignment with respect to the support structure.

9 Claims, 9 Drawing Sheets

(56) References Cited

U.S. PATENT DOCUMENTS

| | | |
|---|---|---|
| 8,686,919 B1 | 4/2014 | Sergi |
| 8,866,695 B2 * | 10/2014 | Renilson .............. H01Q 1/1228 248/218.4 |
| 2002/0180180 A1 * | 12/2002 | McCoy ................... B60D 1/06 280/504 |
| 2010/0066633 A1 * | 3/2010 | Singer ................. H01Q 1/1221 343/882 |
| 2014/0321902 A1 | 10/2014 | Taptic et al. |
| 2015/0259943 A1 * | 9/2015 | Paananen ............... E04H 17/22 52/159 |

* cited by examiner

BRACKET FOR ANTENNA ATTACHMENT

BACKGROUND OF THE INVENTION

1. Field of the Invention

The present invention relates to brackets used to attach antennas to supports such as utility poles. More particularly, the present invention relates to an antenna bracket that can be used to adjust the alignment of the antenna and fixing it in an aligned position.

2. Description of the Prior Art

Presently, antennas such as cellular phone antennas are mounted on support structures that extend 100 feet or more from the surface. They are mounted using mounting brackets. It is important that the antenna be aligned as accurately as possible to ensure optimization of signal exchange. It is difficult to do that at the heights involved. Also, given governmental regulations that restrict the height of the combination of support structure and antenna, the antenna is preferably located as close to the top of the support as possible so as not to exceed height limits of the combination. These two requirements can be difficult to reconcile as spacing the antenna from the top of the support generally enables more effective alignment. Antennas have primarily been installed on utility poles or existing tall utility structures; however, there is an interest and need to optimize cellular phone coverage in certain areas by using support structures other than conventional poles and towers. It is desirable to enable concealment of antennas as much as possible while minimizing service disruption with existing and these alternative support structures.

What is needed is an antenna bracket configured to enable adjustment of the antenna on its support so that it is aligned in a desired position. What is also needed is such an antenna bracket that is relatively low profile to minimize the overall height of the antenna and its support. The antenna bracket should be relatively easy to use and maintain in the environments where it is expected to be used.

SUMMARY OF THE INVENTION

It is an object of the present invention to provide an antenna bracket configured to enable adjustment of an antenna such as a cellular signal transmission/reception antenna on its support so that it is aligned in a desired position. It is also an object of the present invention to provide such an antenna bracket that is relatively low profile to minimize the overall height of the antenna and its support. The antenna bracket is designed to be relatively easy to use and maintain so that it can be placed on the support structure and keep the antenna in a desired alignment under expected weather conditions.

These and other objects are achieved with the present invention, which is an antenna bracket that enables relatively easy alignment of the antenna on its support. It also enables relatively low profile placement of the antenna on the support so that the antenna is located a small distance from the top of the support without compromising the ability to align the antenna where desired. This present bracket helps with antenna concealment and provides a stable mount for antenna optimizations.

The bracket of the present invention includes a first bracket member that is joined to the support as a structural component, a second bracket member that is coupled to the bottom of the antenna, and a bracket interface member that is coupled to the first bracket member. An alignment device formed with a coupling body and a curved member extending from the coupling body is retained between the bracket interface member and the first bracket member and is secured to the second bracket member. The curved member of the alignment device may be spherical in shape. The alignment device may configured like a trailer hitch ball, for example.

A method of installing an antenna on a support structure using the bracket of the present invention is straightforward. First, the first bracket member is secured in a selectable position near the top of the support structure. The first bracket may be formed as an angle with a first leg joined to a side of the support and a second leg extending over the top of the support. Second, the second bracket member is joined to the bottom of the antenna or to a base of an antenna retainer. It is noted that the second bracket member may be joined to the antenna or the base of the antenna retainer prior to attaching the first bracket member to the support structure. Third, the curved member of the alignment device is positioned between the second leg of the first bracket member and the bracket interface member and loosely captured therebetween in a way so that the coupling body of the alignment device extends through a port of the interface bracket. Fourth, the coupling member is secured to the second bracket member that is coupled to the antenna or its retainer as applicable. Fifth, the antenna is moved to a desired position wherein the curved member allows for fine movement of the antenna into a desired position so that appropriate level and alignment can be confirmed. Finally, the interface bracket member is tightened to retain the curved member in a fixed position where the antenna is properly aligned so that the antenna is secured in a desired orientation.

The bracket of the present invention adds only a few inches to the overall height of the support and antenna combination. As a result, the antenna has a very low profile and thereby is fairly well concealed while also aiding in meeting overall height restrictions. The bracket members may be fabricated of relatively inexpensive materials such as steel, aluminum or other metallic and non-metallic materials. The alignment device may be a trailer ball, which is also relatively inexpensive. Its curved member allows for fine movement of the antenna without limitation to a single plane of movement. In addition, the use of the present alignment device as part of the bracket facilitates antenna placement, alignment and securing, thereby improving the installation process and any adjustment or maintenance efforts that may be required.

These and other advantages of the present invention will be further recognized upon review of the following detailed description, accompanying drawings and appended claims.

DETAILED DESCRIPTION OF THE INVENTION

Figure 1:
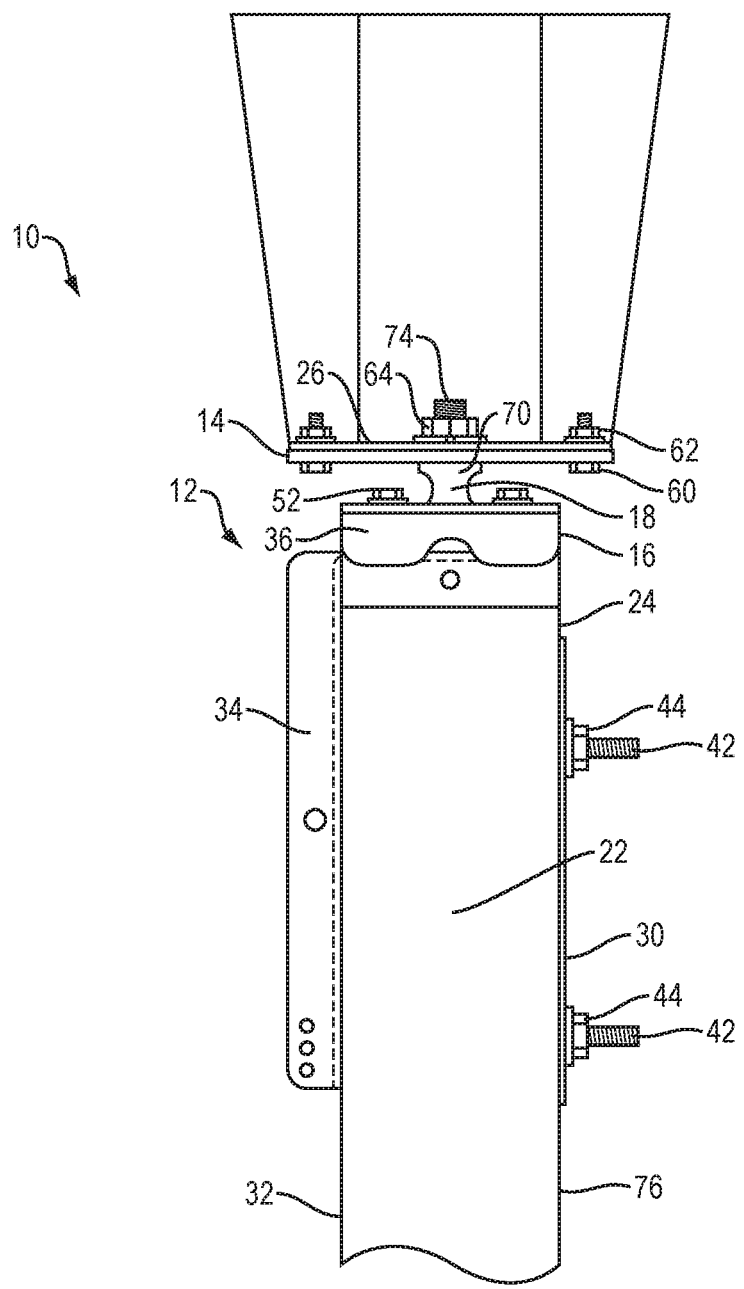
FIG. 1 is a first side view of the bracket of the present invention.
Figure 2:
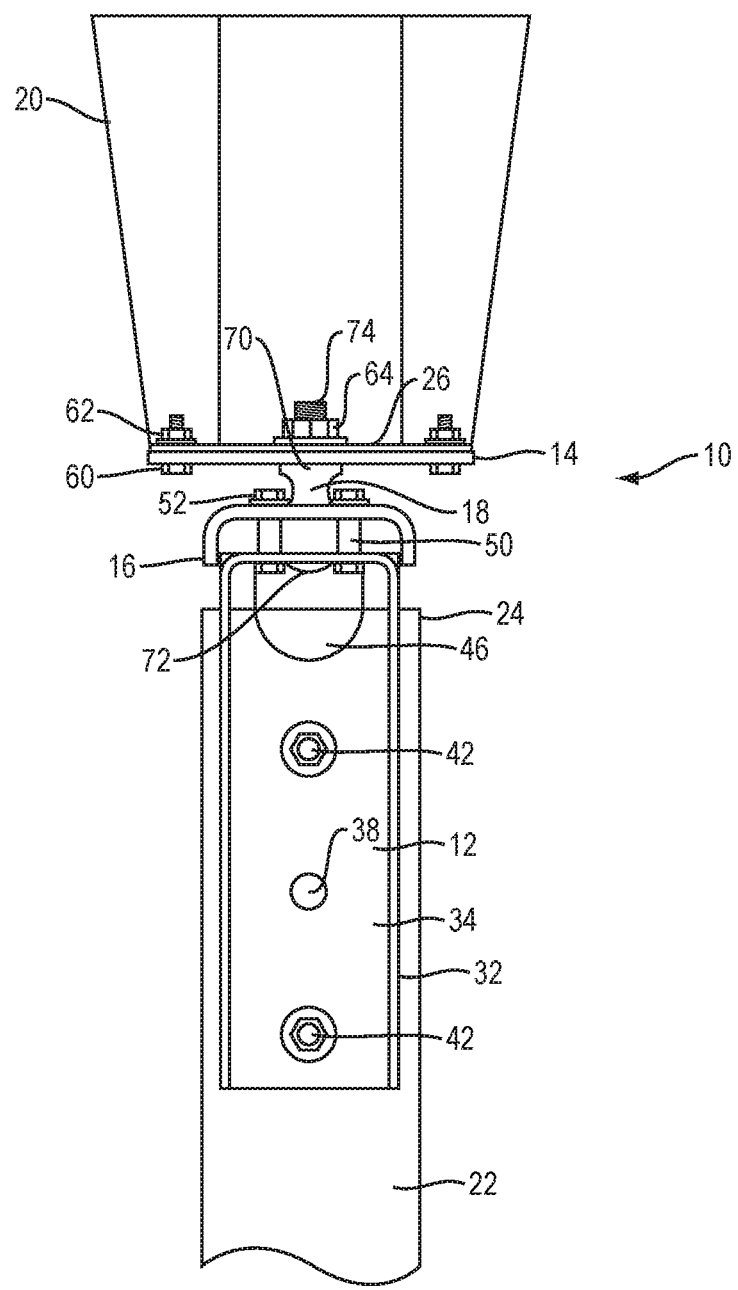
FIG. 2 is a second side view of the bracket that is orthogonal to the first side view of FIG. 1.
Figure 3:
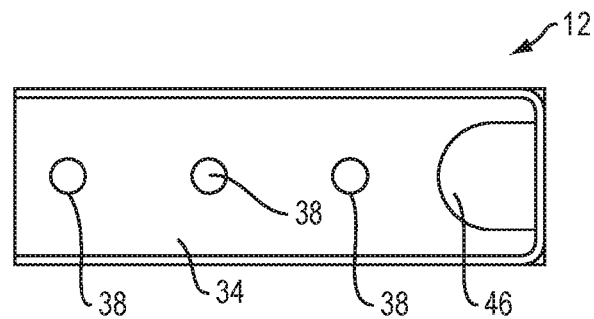
FIG. 3 is a front view of the first bracket member.
Figure 4:
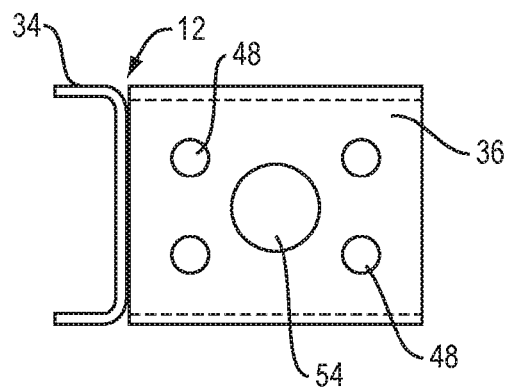
FIG. 4 is a top view of the first bracket member.
Figure 5:
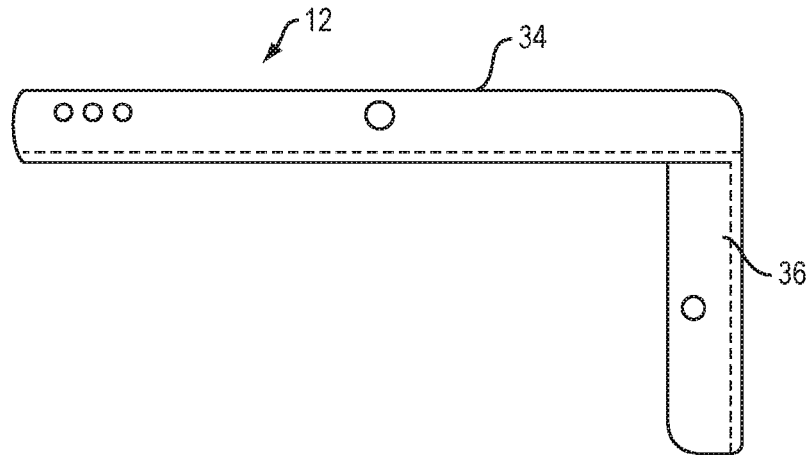
FIG. 5 is a side view of the first bracket member.

An antenna bracket 10 of the present invention is shown in FIGS. 1 and 2. The bracket 10 includes a first bracket member 12, a second bracket member 14, a bracket interface member 16 and an alignment device 18. The antenna bracket 10 is configured to affix an antenna 20 to an antenna support structure 22, which may be a utility pole, for example. The bracket 10 is an adjustable interface between a top 24 of the support structure 22 and a bottom 26 of the antenna 20. The bracket 10 may include an optional backer plate 30 to aid in securing the first bracket member 12 to a side 32 of the support structure 22.

As illustrated in FIGS. 1-5, the first bracket member 12 is of an angled structure including a first leg 34 and a second leg 36. The first bracket member 12 may be made of steel or other suitable material and either or both may be channel shaped. The first leg 34 is configured to join the first bracket member 12 to the side 32 of the support structure 22. The first leg 34 includes one or more ports 38 for insertion of attachment elements such as bolts 42 that pass through the ports 38 and are affixed in position with retainers such as nuts 44. The first leg 34 is orthogonally affixed to the second leg 36. The first leg 34 optionally includes observation portal 46 that permits viewing of a portion of the alignment device 18 when installed. The second leg 36 includes a plurality of ports 48 for retaining the first bracket member 12 to the bracket interface member 16 with attachment elements such as bolts 50 and nuts 52. The second leg 36 further includes alignment device seat 54 configured to receive a portion of the alignment device 18 in a manner that secures the alignment device 18 into the seat 54 when alignment of the antenna 20 using the alignment device 18 has been completed.

Figure 6:
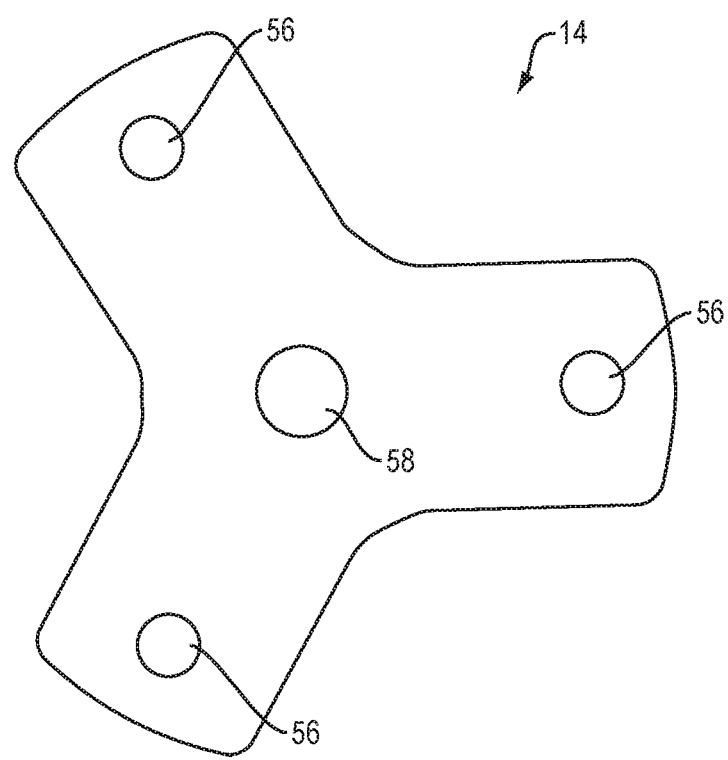
FIG. 6 is a top view of the second bracket member.
Figure 7:
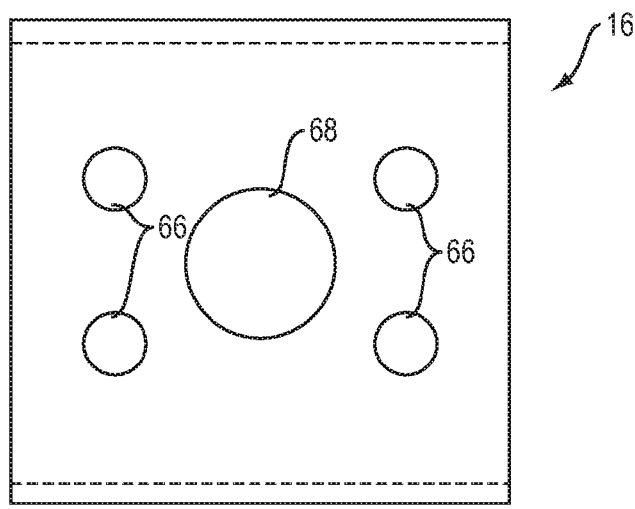
FIG. 7 is a top view of the bracket interface member.
Figure 8:
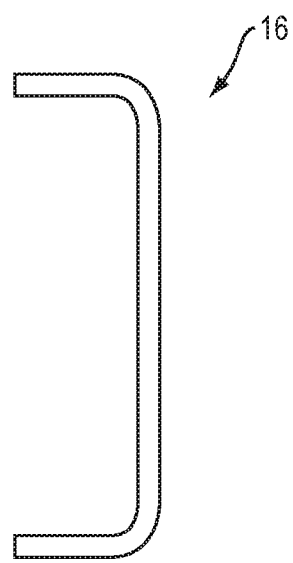
FIG. 8 is a first side view of the bracket interface member.
Figure 9:
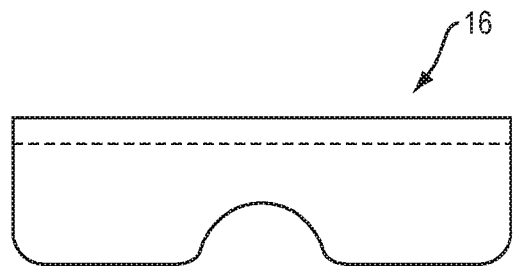
FIG. 9 is a second side view of the bracket interface member that is orthogonal to the first side view of FIG. 8.
Figure 10:
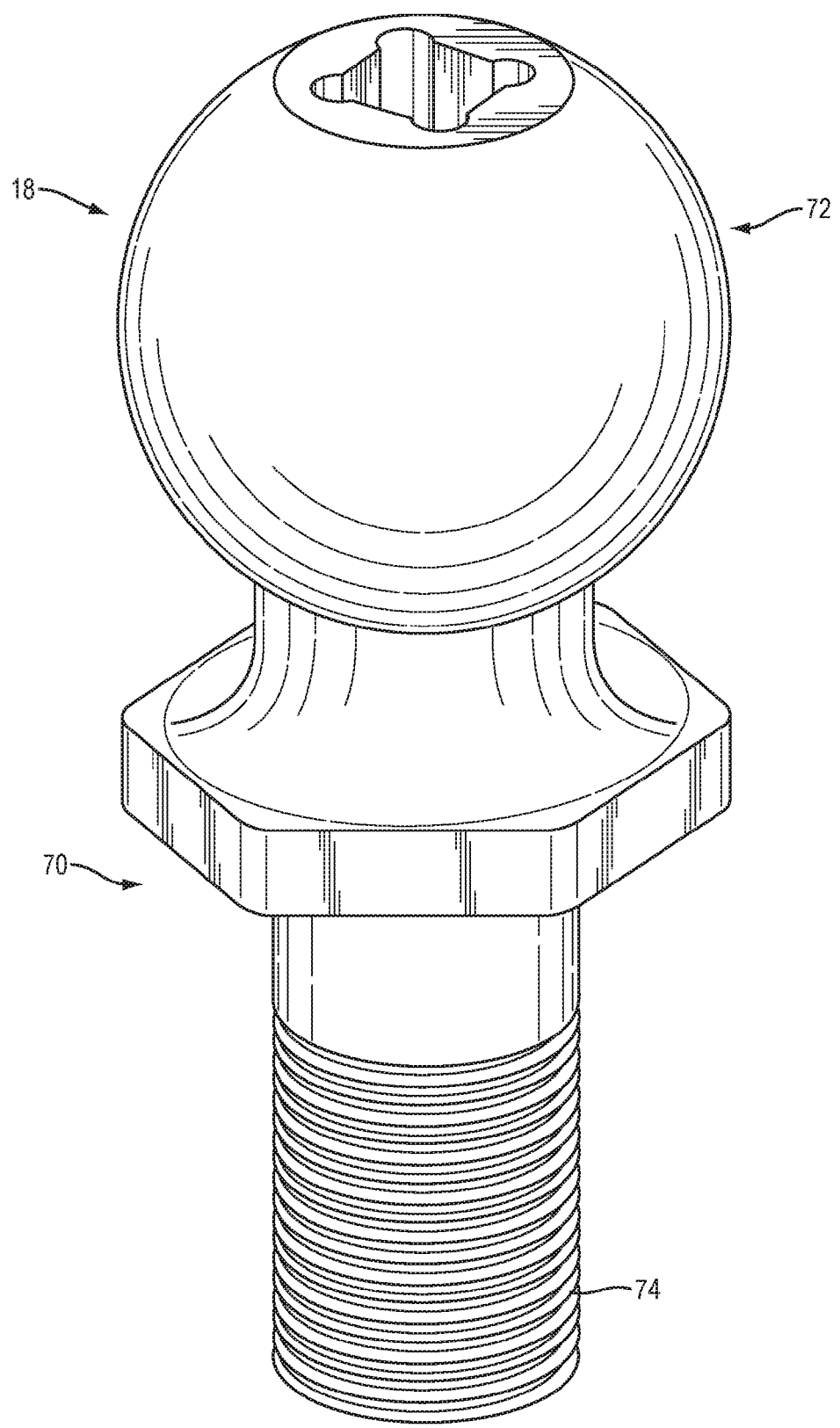
FIG. 10 is a perspective view of an example of the alignment device.
Figure 11:
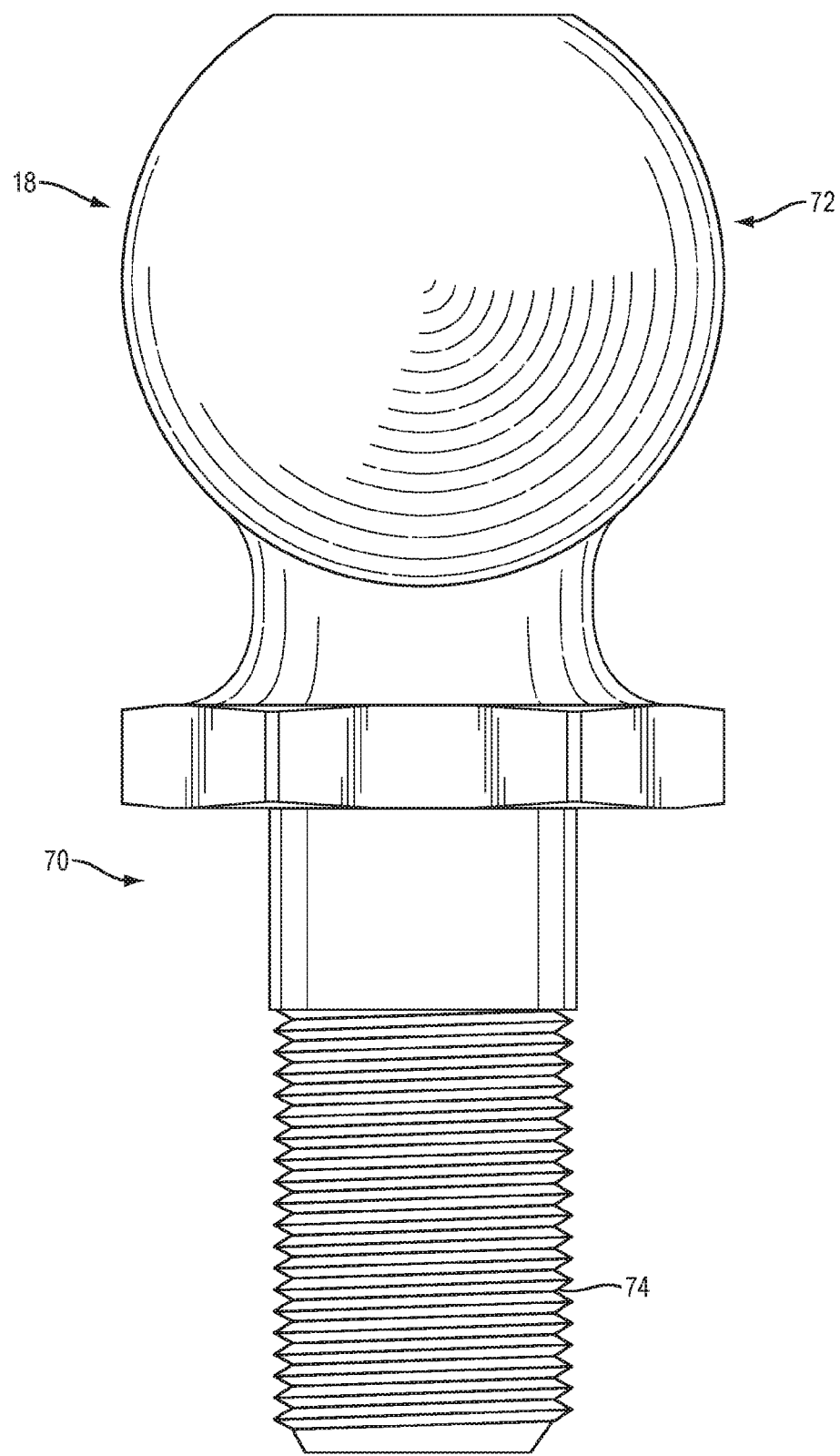
FIG. 11 is a side view of the example of the alignment device.
Figure 12:
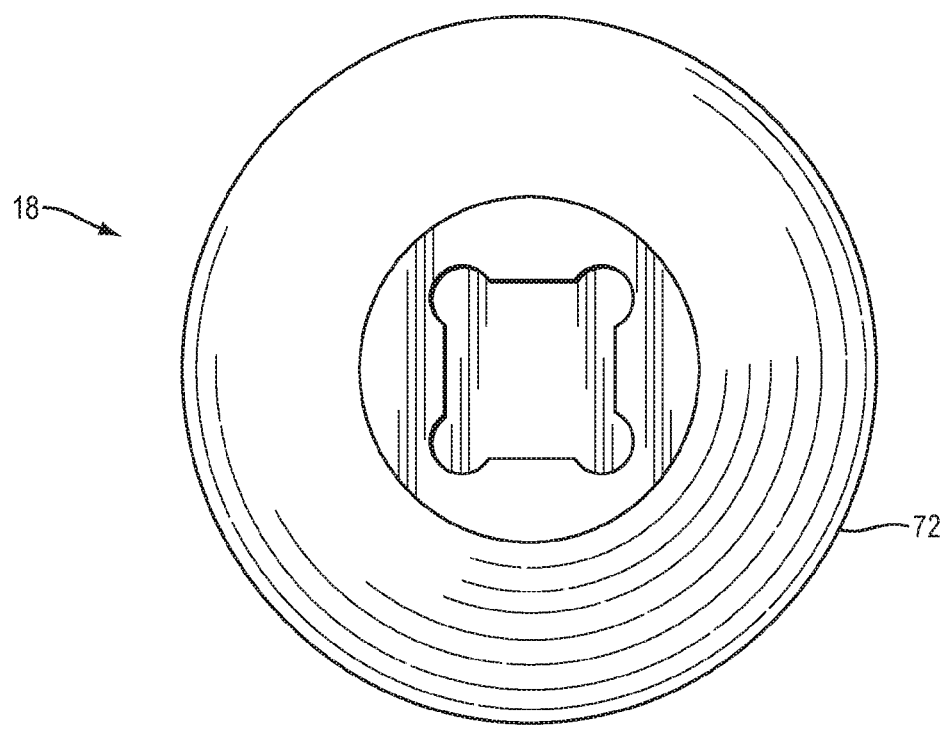
FIG. 12 is a top view of the example of the alignment device.

As illustrated in FIGS. 1, 2 and 6, the second bracket member 14 includes a plurality of ports 56 for attaching the second bracket member 14 to the antenna 20 with attachment elements such as bolts 60 and nuts 62. The second bracket member 14 also includes alignment device port 58 for attaching the alignment device 18 thereto with an attachment element such as nut 64. The second bracket member 14 may be made of steel or other suitable material. While shown as a three-legged structure in FIG. 6, the second bracket member 14 may be of a different shape dependent upon the particular shape of the bottom 26 of the antenna 20.

As illustrated in FIGS. 1, 2 and 7-9, the bracket interface member 16 is a channel configuration. It includes a plurality of ports 66 for retaining the bracket interface member 16 to the second leg 36 of the first bracket member 12 with attachment bolts 50 and nuts 52. The bracket interface member 16 further includes alignment device port 68 configured to allow a portion but not all of the alignment device 18 to extend through it. The channel shape of the bracket interface member 16 ensures that the alignment device 18 remains captured loosely therein as the alignment procedure occurs. It is noted that the bracket interface member 16 may be of a different shape but at least should be shaped to retain a portion of the alignment device 18 therein. The bracket interface member 16 may be made of steel or other suitable material.

FIGS. 1, 2 and 10-13 show an example of the alignment device 18. The alignment device 18 includes a coupling body 70 and a curved member 72 extending therefrom. The alignment device 18 may be a trailer hitch ball but is not limited thereto. The curved member 72 is shaped to allow fine movement in any direction of the antenna 20 with respect to a stationary position of the support structure 22 before the bracket interface member 16 is firmly secured to the second leg 36 of the first bracket member 12. The coupling body 70 is configured for securing the alignment device 18 to the second bracket member 14. For example, the coupling body 70 may be threaded at end 74 for attachment to attachment element 64. During installation, the coupling body 70 of the alignment device 18 is first secured to the second bracket member 14 before the antenna 20 is properly aligned and then the bracket interface member 16 is secured to the first bracket member 12 with the curved member 72 captured therebetween. The alignment device 18 may be made of steel or other suitable material.

Figure 13:
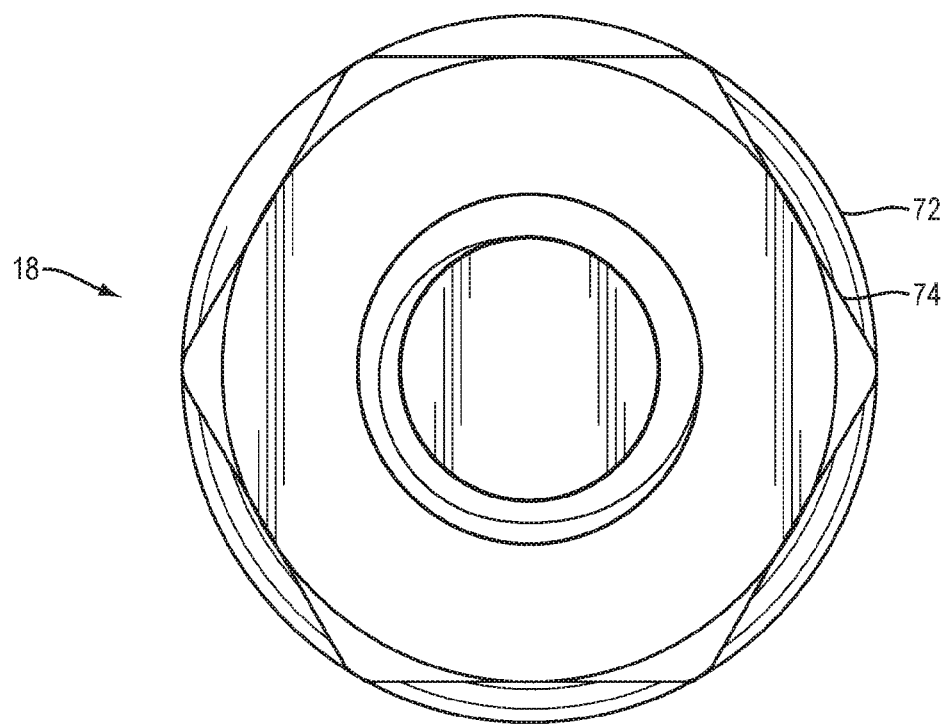
FIG. 13 is a bottom view of the example of the alignment device.
Figure 14:
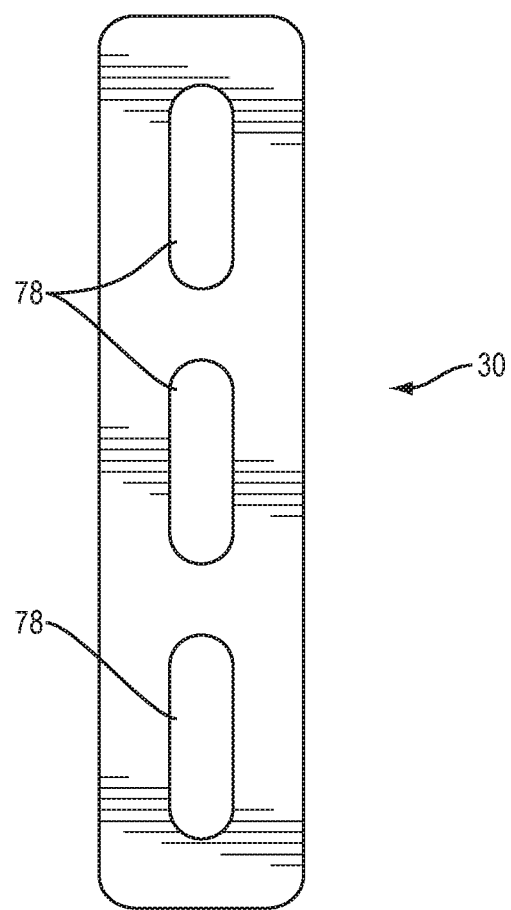
FIG. 14 is a front view of an optional bracket backer member.

FIGS. 1 and 14 illustrate optional backer plate 30. The backer plate 30, if used, is positioned on an opposing surface 76 of the support structure 22. It is essentially a flat plate with a plurality of attachment ports 78 through which attachment elements 42 pass and are retained in place by nuts 44. The ports 78 may be slotted as shown in FIG. 13 to allow adjustment of the location of the backer plate 30 before securing the first bracket member 12 to the support structure 22. Alternatively, the ports 78 may be of a round shape. The backer plate 30 is optional in that the first bracket member 12 may be attached directly to the support structure with the nuts contacting the opposing surface 76 directly. The backer plate 30 may be made of steel or other suitable material.

A method of installing the antenna 20 on the support structure 22 using the bracket 10 comprises a plurality of steps. The first bracket member 12 is secured to the side 32 of the support structure 22 using the bolts 42 and the nuts 44. The second bracket member 14 is affixed to the antenna 20 using bolts 60 and 62. The curved member 72 of the alignment device 18 is positioned between the second leg 36 of the first bracket member 12 and the bracket interface member 16 and is loosely captured therebetween and the coupling body 70 of the alignment device 18 is passed through the alignment device port 68 of the bracket interface member 16. The coupling member 70 is then secured to the second bracket member 14 with nut 64. The antenna 20 is then moved to a desired position by rotating the bracket interface member 16 on the curved member 72. When the alignment of the antenna 20 in a desired location has been confirmed, the interface bracket member 16 is firmly secured to the second leg 36 of the first bracket member 12 so that the curved member 72 is retained in a fixed position.

While the invention has been described with specific reference to particular components of the bracket and particular details of those components, it is to be understood that the invention includes all reasonable equivalents.

What is claimed is:

1. A bracket for aligning and securing an antenna on a support structure, the bracket comprising:
   a. a first bracket member arranged for securing to the support structure, wherein the first bracket member includes a first leg and a second leg, wherein the second leg includes an alignment device seat;

b. a second bracket member arranged for securing to the antenna, wherein the second bracket member includes an alignment device port;

c. a bracket interface member arranged for securing to the first bracket member and the second bracket member, wherein the bracket interface member includes an alignment device port; and d. an alignment device arranged for securing to the second bracket member, the alignment device including a curved member retained by the bracket interface member and configured to enable fine movement of the second bracket member with respect to the first bracket member so that the antenna may be positioned for desired alignment, wherein the first leg of the first bracket member secures the first bracket member to the support structure and the second leg of the first bracket member secures the first bracket member to the bracket interface member, wherein the alignment device is secured to the second bracket member at the alignment device port of the second bracket member, and wherein the alignment device seat of the first bracket member receives a first portion of the alignment device and the alignment device port of the bracket interface member receives a second portion of the alignment device so that the curved member of the alignment device is captured between the first bracket member and the bracket interface member.

2. The bracket of claim 1 wherein the alignment device is a trailer hitch ball.

3. The bracket of claim 1 further comprising a backer plate arranged to aid in attaching the first bracket member to the support structure.

4. The bracket of claim 1 wherein the bracket interface member is of a channel shape.

5. The bracket of claim 1 wherein the first leg of the first bracket member is orthogonally affixed to the second leg of the first bracket member.

6. The bracket of claim 5 wherein only the first leg of the first bracket member is affixed to the support structure.

7. The bracket of claim 1 wherein the second bracket member is a three-legged structure.

8. The bracket of claim 1 wherein the alignment device includes a coupling body that is secured to the second bracket member.

9. The bracket of claim 1 wherein the first leg of the first bracket member includes an observation portal.

\* \* \* \* \*